United States Patent
Wang et al.

(10) Patent No.: US 12,477,476 B2
(45) Date of Patent: Nov. 18, 2025

(54) POWER ALLOCATION OR OBTAINING METHOD AND APPARATUS, AND NODE DEVICE

(71) Applicant: VIVO MOBILE COMMUNICATION CO., LTD., Dongguan (CN)

(72) Inventors: Huan Wang, Dongguan (CN); Jinhua Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 428 days.

(21) Appl. No.: 18/155,116

(22) Filed: Jan. 17, 2023

(65) Prior Publication Data

US 2023/0156624 A1 May 18, 2023

Related U.S. Application Data

(63) Continuation of application No. PCT/CN2021/108078, filed on Jul. 23, 2021.

(30) Foreign Application Priority Data

Jul. 24, 2020 (CN) .......................... 202010724914.8

(51) Int. Cl.
*H04W 52/34* (2009.01)
*H04W 52/36* (2009.01)

(52) U.S. Cl.
CPC ......... *H04W 52/34* (2013.01); *H04W 52/365* (2013.01); *H04W 52/367* (2013.01)

(58) Field of Classification Search
CPC . H04W 52/34; H04W 52/365; H04W 52/367; H04W 52/346; H04W 52/386; H04W 52/38; H04W 52/228
See application file for complete search history.

(56) References Cited

U.S. PATENT DOCUMENTS

2019/0132096 A1\* 5/2019 Abedini ................ H04W 52/46
2019/0208478 A1 7/2019 Park et al.
(Continued)

FOREIGN PATENT DOCUMENTS

| CN | 110166273 A | 8/2019 |
|----|-------------|--------|
| CN | 110972156 A | 4/2020 |
| CN | 111148151 A | 5/2020 |

OTHER PUBLICATIONS

European Patent Office, Extended European Search Report issued in corresponding Application No. EP 21845521, dated Dec. 22, 2023.
(Continued)

*Primary Examiner* — Jinsong Hu
*Assistant Examiner* — Rui M Hu
(74) *Attorney, Agent, or Firm* — Stites & Harbison, PLLC; Jeffrey A. Haeberlin

(57) ABSTRACT

This application discloses a power allocation or obtaining method and apparatus, and a node device, which pertains to the field of communications technologies. The power obtaining method according to this application includes: obtaining transmit power information of a distributed unit DU and transmit power information of a mobile Termination MT, where the transmit power information of the DU includes a transmit power or maximum transmit power of the DU, and the transmit power of the MT includes a transmit power of at least one cell group of the MT.

19 Claims, 3 Drawing Sheets

(56) References Cited

U.S. PATENT DOCUMENTS

| | | | | |
|---|---|---|---|---|
| 2019/0373627 | A1* | 12/2019 | Luo | H04W 72/542 |
| 2021/0176793 | A1* | 6/2021 | Abedini | H04W 52/146 |
| 2021/0258890 | A1* | 8/2021 | Takeda | H04W 52/346 |
| 2022/0330176 | A1* | 10/2022 | Kowalski | H04W 52/242 |
| 2023/0049634 | A1* | 2/2023 | Kurita | H04W 52/245 |
| 2023/0072350 | A1* | 3/2023 | Kurita | H04W 52/242 |
| 2023/0076802 | A1* | 3/2023 | Yuan | H04W 52/143 |
| 2023/0118279 | A1* | 4/2023 | Huang | H04L 5/0094 |
| | | | | 370/329 |
| 2023/0156684 | A1* | 5/2023 | Wang | H04W 72/563 |
| | | | | 370/329 |
| 2023/0180147 | A1* | 6/2023 | Kowalski | H04W 52/46 |
| | | | | 455/522 |
| 2024/0306100 | A1* | 9/2024 | Noh | H04W 52/42 |
| 2024/0340808 | A1* | 10/2024 | Shim | H04W 52/36 |

OTHER PUBLICATIONS

Japan Patent Office, First Office Action issued in corresponding Application No. JP 2022-579722 dated Apr. 9, 2024. (Translation not available.).

3GPP TSG RAN WG1 Meeting #95. Spokane, USA, Nov. 12-16, 2018. CMCC. R1-1812878. Discussions on enhancements to support NR Backhaul links.

3GPP TSG RAN WG1 Meeting #101-e. E-meeting, May 25-Jun. 5, 2020. Huawei, HiSilicon. R1-2004147. Rel-16 UE features for IAB.

3GPP TSG-RAN WG1 Meeting #101-e. E-meeting, May 25-Jun. 5, 2020. Ericsson. R1-2004585. UE features for IAB-MTs.

China National Intellectual Property Administration, International Search Report issued in corresponding Application No. PCT/CN2021/108078, mailed Sep. 27, 2021.

* cited by examiner

POWER ALLOCATION OR OBTAINING METHOD AND APPARATUS, AND NODE DEVICE

CROSS-REFERENCE TO RELATED APPLICATIONS

This application is a continuation of International Application No. PCT/CN2021/108078, filed on Jul. 23, 2021, which claims priority to Chinese Patent Application No. 202010724914.8 filed in China on Jul. 24, 2020, which are incorporated herein by reference in their entireties.

TECHNICAL FIELD

The present disclosure relates to the field of communications technologies, and in particular, to a power allocation or obtaining method and apparatus, and a node device.

BACKGROUND

In the integrated access backhaul (IAB) technology, a distributed unit (DU) and a mobile Termination (MT) of an IAB node may perform transmission simultaneously. In addition, the IAB node may be connected to multiple parent IAB (parent IAB) nodes and transmit information to the multiple parent IAB nodes simultaneously (for example, dual connectivity for IAB MT). In consideration with hardware limitation on the IAB node, when the DU, an MT's master cell group (MCG), and an MT's secondary cell group (SCG) of the IAB node perform transmission simultaneously, a total transmit power needs to be shared among the DU, MT MCG and MT SCG but multi-connection in the MT is not considered in a power sharing solution in the related art. Therefore, there is no solution for power sharing among an MT MCG link, an MT SCG link, and the DU in the related art.

SUMMARY

According to a first aspect of the present disclosure, a power obtaining method is provided, applied to a first node device and including:
  obtaining transmit power information of a distributed unit DU and transmit power information of a mobile Termination MT,
  where the transmit power information of the DU includes a transmit power or maximum transmit power of the DU, and the transmit power information of the MT includes a transmit power or maximum transmit power of at least one cell group of the MT.

According to a second aspect of the present disclosure, a power allocation method is provided, applied to a second node device and including:
  configuring transmit power information of a distributed unit DU and transmit power information of an MT,
  where the transmit power information of the DU includes a transmit power or maximum transmit power of the DU, and the transmit power information of the MT includes a transmit power or maximum transmit power of at least one cell group of the MT.

According to a third aspect of the present disclosure, a power obtaining apparatus is provided, applied to a first node device and including:
  a first obtaining module, configured to obtain transmit power information of a distributed unit DU and transmit power information of a mobile Termination MT,
  where the transmit power information of the DU includes a transmit power or maximum transmit power of the DU, and the transmit power information of the MT includes a transmit power or maximum transmit power of at least one cell group of the MT.

According to a fourth aspect of the present disclosure, a power allocation apparatus is provided, applied to a second node device and including:
  a configuring module, configured to configure transmit power information of a distributed unit DU and transmit power information of an MT,
  where the transmit power information of the DU includes a transmit power or maximum transmit power of the DU, and the transmit power information of the MT includes a transmit power or maximum transmit power of at least one cell group of the MT.

According to a fifth aspect of the present disclosure, a node device is provided, where the terminal includes a processor, a memory, and a program or an instruction stored in the memory and capable of running on the processor, and when the program or the instruction is executed by the processor, the steps of the method described in the first aspect or the second aspect are implemented.

According to a sixth aspect of the present disclosure, a readable storage medium is provided, where the readable storage medium stores a program or an instruction, and when the program or the instruction is executed by a processor, the steps of the method described in the first aspect or the steps of the method described in the second aspect are implemented.

According to a seventh aspect of the present disclosure, a chip is provided, where the chip includes a processor and a communication interface, the communication interface is coupled to the processor, and the processor is configured to run a program or an instruction of a network side device, to implement the method described in the first aspect or the method described in the second aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in the specification and claims of this application are used to distinguish between similar objects instead of describing a specific order or sequence. It should be understood that, data used in this way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that the technology described in this application is not limited to a Long Term Evolution (LTE)/LTE-advanced (LTE-A) system, and may also be used in other wireless communication systems, for example, Code Division Multiple Access (CDMA), Time Division Multiple Access (TDMA), Frequency Division Multiple Access (FDMA), Orthogonal Frequency Division Multiple Access (OFDMA), and Single-carrier Frequency-Division Multiple Access (SC-FDMA). The terms "system" and "network" in the embodiments of this application may be used interchangeably. The described technologies can be applied to both the systems and the radio technologies mentioned above as well as to other systems and radio technologies. However, a new radio (NR) system is described below as an example, and the term NR is used in most of the descriptions, although these technologies can also be used in an application other than an application of the NR system, for example, a sixth (6G) communications system.

To enable those skilled in the art to better understand the present disclosure, an IAB system will be described below.

Figure 1:
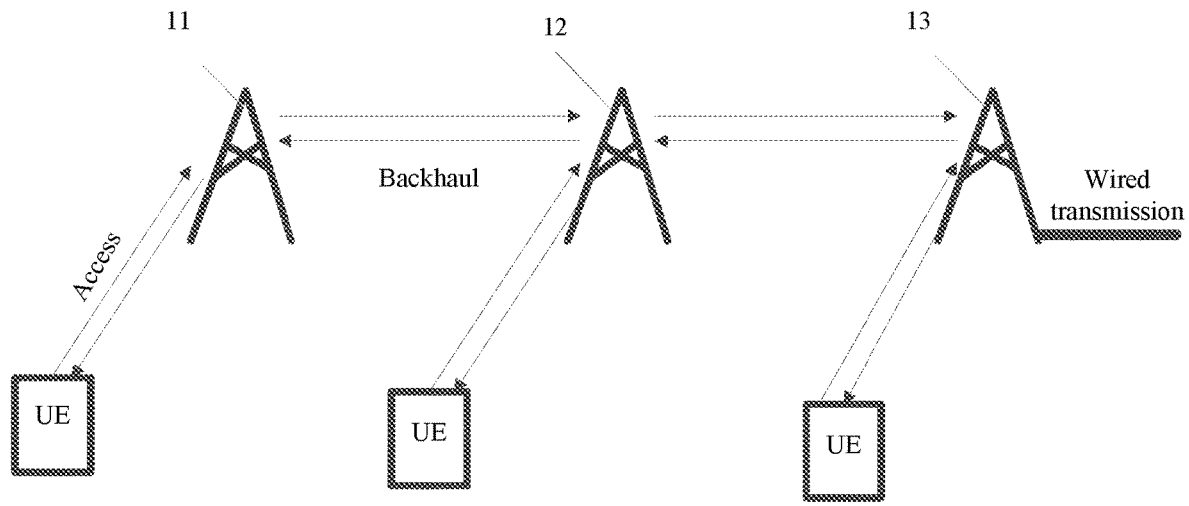
FIG. 1 is a schematic structural diagram of an IAB system.

The integrated access backhaul (IAB) system is a technology for developing the NR Rel-16 standard. FIG. 1 is a schematic diagram of an IAB system. One IAB node includes a distributed unit (DU) functional part and a mobile Termination (MT) functional part. Based on the MT, an access point (namely, an IAB node) 11 may find an upstream access point (parent IAB node, parent node) 12 and establish a wireless connection with a DU of the upstream access point, and the wireless connection is called a backhaul link (backhaul link). After an IAB node establishes a complete backhaul link, the IAB node enables a DU function of the backhaul link, and the DU may provide a cell service, that is, the DU may provide an access service for a UE. One IAB loop includes a donor (donor) IAB node 13, and the donor IAB node has a directly connected wired transmission network.

Figure 2:
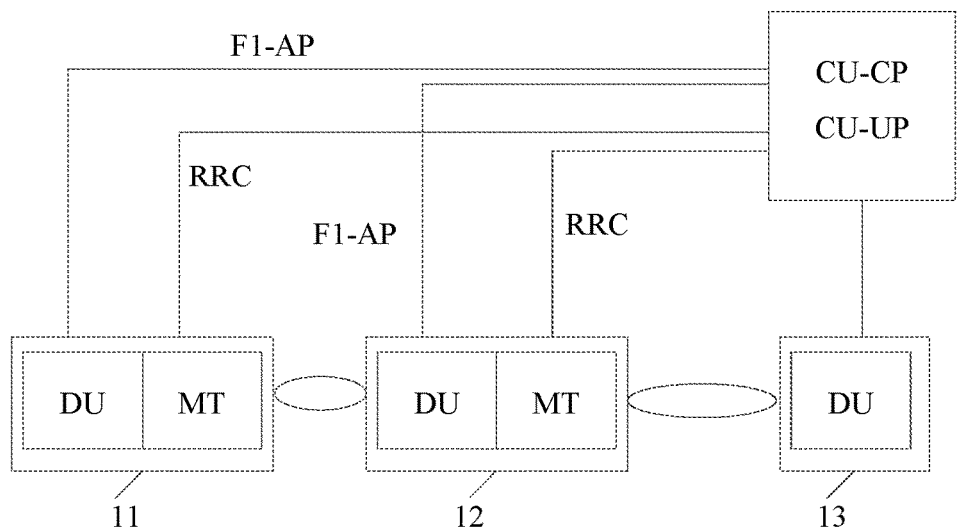
FIG. 2 is a schematic structural diagram of a CU-DU of the IAB system.

FIG. 2 is a structural diagram of a centralized unit-distributed unit (CU-DU) of the IAB system. A CU may also be called a control unit. In one IAB loop, all DUs of an IAB node are connected to one CU node, and this CU node configures the DUs through an F1-AP protocol. MTs are configured by the CU through an RRC protocol. The donor IAB node is not provided with an MT functional part.

The IAB system is introduced to resolve a problem that a wired transmission network is not deployed in place when access points are densely deployed. That is, when there is no wired transmission network, the access points may rely on wireless backhaul.

With reference to the accompanying drawings, the following describes the power obtaining method provided in the embodiments of this application in detail based on specific embodiments and application scenarios thereof.

Figure 3:
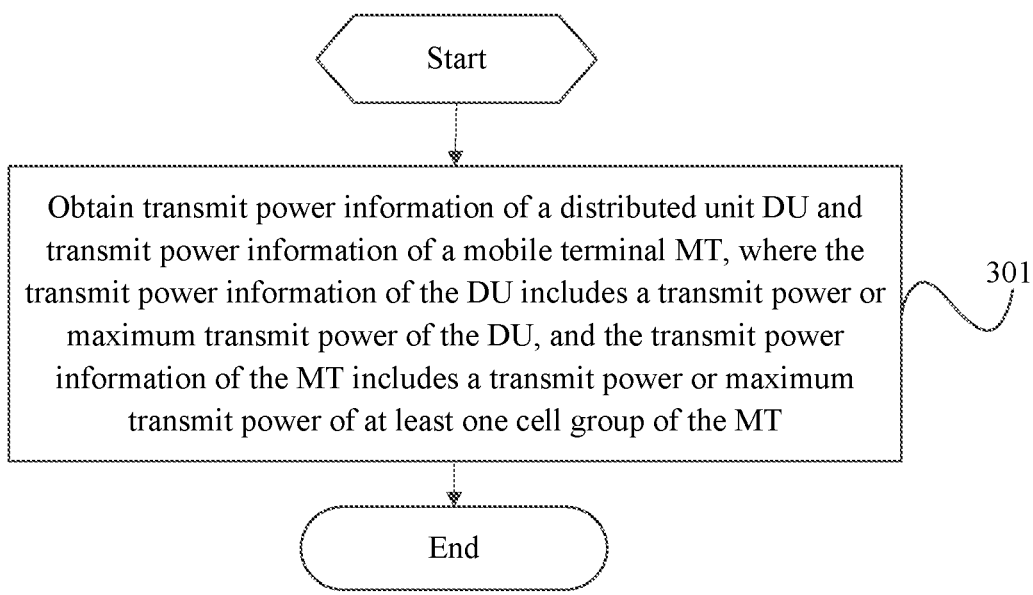
FIG. 3 is a schematic flowchart of a power obtaining method according to an embodiment of this application.

As shown in FIG. 3, an embodiment of this application provides a power obtaining method, applied to a first node device, where the first node device is an IAB node. The method includes:

Step 301: Obtain transmit power information of a distributed unit DU and transmit power information of a mobile Termination MT,
where the transmit power information of the DU includes a transmit power or maximum transmit power of the DU, and the transmit power information of the MT includes a transmit power or maximum transmit power of at least one cell group of the MT.

Obtaining the transmit power of the at least one cell group of the MT may be obtaining a transmit power of an MT's master cell group and a transmit power of an MT's secondary cell group, or obtaining a transmit power of n cell groups of the MT, where n is less than or equal to N, and N is the number of cell groups of the MT.

Optionally, the transmit power information of the MT further includes a transmit power of the MT.

At least one of the transmit power information of the DU and the transmit power information of the MT is obtained in at least one of the following manners:
a specification in a protocol;
configuration or indication by a centralized unit CU; or
configuration or indication by a parent node.
The parent node is a parent node of the IAB node.

Optionally, the transmit power of the DU is static or semi-static, and the transmit power of the at least one cell of the MT is determined in a static, semi-static, or dynamic manner.

In the power obtaining method in this embodiment of this application, the transmit power information of the distributed unit DU and the transmit power information of the mobile Termination MT are obtained, where the transmit power information of the DU includes a transmit power or maximum transmit power of the DU, and the transmit power information of the MT includes the transmit power or maximum transmit power of the at least one cell group of the MT. Therefore, power sharing between the DU and the at least one cell group of the MT can be implemented, and power efficiency for IAB transmission can be improved.

Optionally, the transmit power information of the DU and the transmit power information of the MT are valid at a first moment, and a maximum transmit power information of the DU at another moment is not limited thereto. For example, at another moment, a power of the DU may be $P_{total}$ or a preset value $P_x$ ($P_x \leq P_{total}$), where $P_{total}$ is a supported total transmit power of the DU and MT.

The first moment is a moment when the DU and the at least one cell group of the MT transmit information simultaneously.

Further, optionally, the first moment is a moment when the DU and the at least one cell group of the MT actually transmit information simultaneously,
or the first moment is a moment when the DU and the at least one cell group of the MT are configured to transmit information simultaneously.

Further, optionally, the first moment is determined based on at least one of the following:
configuration of time division duplex TDD for the DU and MT; and
configuration of a resource type of the DU.

For example, for a same time-frequency resource block, if the DU is configured with a DL-hard type or DL-soft type, while the MT is configured (or scheduled) with an uplink UL type, it is determined that the DU and MT are configured to transmit information simultaneously.

The foregoing DL-hard and DL-soft are resource types of the DU. To support time division multiplexing TDM between an access link (access link) and a backhaul link (backhaul link), Rel-16 defines three resource types of IAB DU, namely, hard, soft, and not available (NA).

Hard type: a corresponding time domain resource is always available for the access link of the IAB DU.

Soft type: whether the corresponding time domain resource is available or not is controlled by the parent node for the access link of the IAB DU.

NA type: the corresponding time domain resource is always unavailable for the access link of the IAB DU.

Optionally, the obtaining transmit power information of a distributed unit DU and transmit power information of a mobile Termination MT includes:

respectively obtaining at least one of the transmit power information of the DU and the transmit power information of the MT at different first moments, where the first moments include at least one of the following:

a moment when the DU and n cell groups of the MT perform transmission simultaneously;

a moment when the DU and an MT's master cell group perform transmission simultaneously;

a moment when the DU and an MT's secondary cell group perform transmission simultaneously; or a moment when n cell groups of the MT perform transmission simultaneously, where 0≤n≤N, n is an integer, and N is the number of MT's cell groups.

It should be noted that in a case that the DU and the n cell groups of the MT perform transmission simultaneously, different values of n correspond to different first moments. For example, when n is 2, it corresponds to one first moment, and when n is 3, it corresponds to another first moment. Similarly, in a case that the n cell groups of the MT perform transmission simultaneously, different values of n correspond to different first moments. In particular, in a case that the DU, the MT, or a cell group of the MT does not perform transmission, a transmit power of the DU, MT, or a cell group of the MT that does not perform transmission is 0.

Optionally, obtaining the transmit power information of the MT includes:

respectively obtaining a transmit power of a physical random access channel PRACH and a transmit power of another uplink physical channel, where the another uplink physical channel includes at least one of the following:

a transmit power of a physical uplink control channel;

a transmit power of a physical uplink shared channel; or a transmit power of a sounding reference signal.

That is, in this embodiment of this application, obtaining of the transmit power of the PRACH is independent of obtaining of the transmit power of the another uplink physical channel, that is, the transmit power of the PRACH and the transmit power of the another uplink physical channel are respectively obtained through different signalings or manners.

In addition, different transmit power values may be defined on an MT-specific RACH occasion (MT-specific RACH occasion) and a common RACH occasion (common RACH occasion).

Optionally, after obtaining the transmit power information of the distributed unit DU and the transmit power information of the MT, the method further includes:

notifying at least one of a sum of the transmit power of the DU and a transmit power of the MT, the transmit power information of the DU, or the transmit power information of the MT to a target node, where the target node is a parent node of an integrated access backhaul IAB node, a child node of the IAB node, or a centralized unit CU connected to the DU, and the IAB node is an IAB node to which the DU and the MT belong.

Alternatively, a capability of the IAB MT or IAB may be reported, to notify at least one of the sum of the transmit power of the DU and the transmit power of the MT, the transmit power of the DU, or the transmit power of the MT to the target node.

Optionally, the maximum transmit power of the at least one cell group of the MT includes a maximum transmit power $Q_{MCG}$ of the MT's master cell group and a maximum transmit power $Q_{SCG}$ of the MT's secondary cell group; and after obtaining the transmit power information of the distributed unit DU and the transmit power information of the MT, the method further includes:

obtaining an actually maximum transmit power of the MT's master cell group and an actually maximum transmit power of the MT's secondary cell group based on $Q_{MCG}$ and $Q_{SCG}$ and according to a preset power sharing rule.

The preset power sharing rule includes a first power sharing rule or a second power sharing rule, where the first power sharing rule means that dynamic power sharing is implemented when a sum of $Q_{MCG}$ and $Q_{SCG}$ is greater than a first power; and the second power sharing rule means that semi-static power sharing is implemented when the sum of $Q_{MCG}$ and $Q_{SCG}$ is less than or equal to the first power, where the first power is the maximum transmit power of the MT or a preset fixed power value.

The following describes power sharing between the MCG and SCG under dual connectivity (DC).

If a UE is in a dual connectivity state, a transmit power of the UE may be shared between an MCG link and an SCG link. Power sharing between the MCG link and the SCG link may be classified into semi-static power sharing and dynamic power sharing.

For the semi-static power sharing, a sum of a maximum uplink transmit power configured for the MCG link and a maximum uplink transmit power configured for the SCG link is less than or equal to a total transmit power of the UE, and power control for the MCG and SCG is respectively limited by the maximum transmit power respectively configured for the MCG and SCG For NR-NR dual connectivity, the maximum transmit power configured for the MCG link and the maximum transmit power configured for the SCG link only applies to a moment when simultaneous transmission exists in the MCG link and SCG link.

For dynamic power sharing, a principle of a minimum guaranteed power is used for LTE DC, the MCG link and SCG link are separately configured with a minimum guaranteed transmit power, and a sum of the minimum guaranteed transmit power is less than or equal to a maximum transmit power of the UE, while the MCG link and SCG link may share a remaining power (that is, a remaining power obtained by subtracting the sum of the minimum guaranteed transmit power for the MCG link and SCG link from the total power). A principle of a maximum power is used for NR-NR DC, and the MCG link and SCG link are separately configured with a maximum transmit power, and a sum of the maximum transmit power may be greater than the maximum transmit power of the UE. When the sum of the power required for the MCG link and SCG link for simultaneous transmission is greater than the maximum transmit power of the UE, the UE needs to preferentially allocate a transmit power to the MCG link, to ensure transmission over the MCG link. However, the transmit power for the MCG link is still limited by the configured maximum transmit power, and the transmit power for the SCG link is limited by a smaller one of the configured maximum transmit power and the remaining transmit power (that is, a remaining transmit power obtained by subtracting the transmit power for the MCG link from the total power).

Optionally, before obtaining an actually maximum transmit power of the MT's master cell group and an actually maximum transmit power of the MT's secondary cell group, the method further includes:

adjusting at least one of $Q_{MCG}$ and $Q_{SCG}$ according to a difference between the preset fixed power value and the maximum transmit power of the MT in a case that the preset fixed power value is different from the maximum transmit power of the MT.

In this embodiment of this application, total transmit power $Q_{MCG}+Q_{SCG}$ among the MT's cell groups is limited by the maximum transmit power ($P_{cmax}$ or $Q_{MT}$) of the MT or the preset fixed power value $P_{fixed}$ ($P_{fixed}=P_{cmax}$ or $P_{total}$) that is agreed in a protocol or configured. $P_{cmax}$ is the maximum transmit power of the MT agreed in a protocol, and $P_{total}$ is the configured maximum transmit power of the MT.

In a case that the preset fixed power value is different from the maximum transmit power of the MT, as an alternative implementation manner, $Q_{MCG}$ or $Q_{SCG}$ is adjusted. For example, if a difference between the preset fixed power value and the maximum transmit power of the MT is 10 watts, that is, if the preset fixed power value is 10 watts greater than the maximum transmit power of the MT, $Q_{MCG}$ will be reduced by 10 watts, or $Q_{SCG}$ will be reduced by 10 watts. For another example, the difference between the preset fixed power value and the maximum transmit power of the MT is −10 watts, that is, if the preset fixed power value is 10 watts less than the maximum transmit power value of the MT, the $Q_{MCG}$ will be increased by 10 watts, or the $Q_{SCG}$ will be increased by 10 watts, that is, an adjusted value of $Q_{MCG}$ or $Q_{SCG}$ is the same as the foregoing difference.

In a case that the preset fixed power value is different from the maximum transmit power of the MT, as another alternative implementation manner, both $Q_{MCG}$ and $Q_{SCG}$ are adjusted. Alternatively, according to the difference between the preset fixed power value and the maximum transmit power of the MT, $Q_{MCG}$ is adjusted according to a first adjustment ratio, and $Q_{SCG}$ is adjusted according to a second adjustment ratio. The first adjustment ratio and the second adjustment ratio may be the same or different. Optionally, a sum of the first adjustment ratio and the second adjustment ratio is 1. For example, the two adjustment ratios are 0.5 respectively, that is, $Q_{MCG}$ and $Q_{SCG}$ divide the difference equally. Optionally, the first adjustment ratio and the second adjustment ratio are determined according to the difference. For example, if the preset fixed power value is increased by 10% relative to the maximum transmit power of the MT, it is determined that the foregoing first adjustment ratio and second adjustment ratio are respectively 10%, that is, $Q_{MCG}$ and $Q_{SCG}$ are respectively increased by 10%.

In addition, in a case that the MCG and SCG do not perform transmission simultaneously, a maximum power of the MCG and a maximum power of the SCG are limited by the maximum transmit power of the MT.

Optionally, the power obtaining method in this embodiment of this application further includes:

reporting at least one power headroom report PHR, where an upper power limit calculated through the PHR is assumed as at least one of the following:
a power in the transmit power information; and
an actually maximum transmit power.

It is assumed that the maximum transmit power of the MT MCG/MT SCG is a theoretically achievable maximum transmit power (such as $P_{total}$, $P_{cmax}$, $Q_{MT}$, $Q_{MCG}$, $Q_{SCG}$, a value adjusted from $Q_{MCG}$, a value adjusted from $Q_{SCG}$, $Q_1$, or $Q_2$), and/or the actually maximum transmit power (such as a power obtained by dividing a transmit power occupied by a highly preferentially cell group from the maximum transmit power of the MT). $Q_1$ is a maximum transmit power configured for the master cell group, and $Q_2$ is a maximum transmit power configured for the secondary cell group.

In this embodiment of this application, multiple PHRs may be reported simultaneously, or different PHRs may be reported according to different transmission conditions.

In the power obtaining method in this embodiment of this application, the transmit power information of the distributed unit DU and the transmit power information of the mobile Termination MT are obtained, where the transmit power information of the DU includes a transmit power or maximum transmit power of the DU, and the transmit power information of the MT includes the transmit power or maximum transmit power of the at least one cell group of the MT. Therefore, power sharing between the DU and the at least one cell group of the MT can be implemented, and power efficiency for IAB transmission can be improved.

Figure 4:
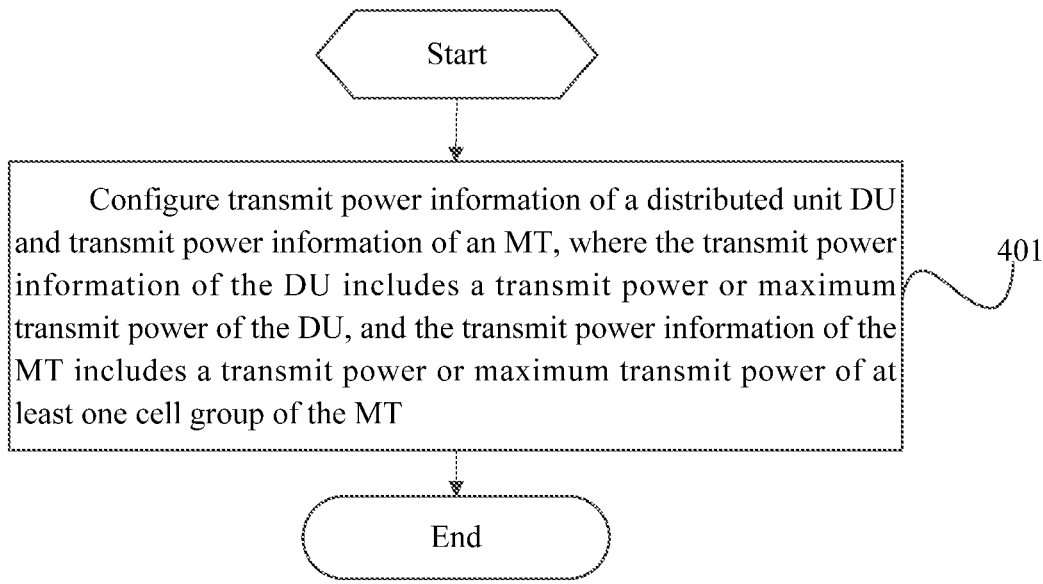
FIG. 4 is a schematic flowchart of a power allocation method according to an embodiment of this application.

As shown in FIG. 4, an embodiment of this application also provides a power allocation method, applied to a second node device, where the second node device is a CU or a parent node of the IAB node, and the method includes:

Step 401: Configure transmit power information of a distributed unit DU and transmit power information of an MT, where the transmit power information of the DU includes a transmit power or maximum transmit power of the DU, and the transmit power information of the MT includes a transmit power or maximum transmit power of at least one cell group of the MT.

Optionally, the transmit power of the DU is static or semi-static, and the transmit power of the at least one cell of the MT is allocated in a static, semi-static, or dynamic manner.

Optionally, the transmit power information of the MT further includes a transmit power of the MT.

Configuring the transmit power or maximum transmit power of the at least one cell group of the MT may be configuring a transmit power or maximum transmit power of an MT's master cell group and configuring a transmit power or maximum transmit power of an MT's secondary cell group, or may be configuring a transmit power or maximum transmit power of n cell groups of the MT, where n is less than or equal to N, and N is the number of cell groups of the MT.

In the power allocation method in this embodiment of this application, the transmit power information of the distributed unit DU and the transmit power information of the MT are configured, where the transmit power information of the DU includes a transmit power or maximum transmit power of the DU, and the transmit power information of the MT includes the transmit power or maximum transmit power of the at least one cell group of the MT. Therefore, power sharing between the DU and the at least one cell group of the MT can be implemented, and power efficiency for IAB transmission can be improved.

In this embodiment of this application, the transmit power of the DU and the transmit power of the MT may be configured first, and then the transmit power of the at least one cell group of the MT may be configured; or the transmit power of the DU and the transmit power of the at least one cell group of the MT may be allocated directly and separately. For example, the transmit power of the DU, the transmit power of the MT's master cell group, and the transmit power of the MT's secondary cell group are allocated separately.

Optionally, allocating the transmit power of the distributed unit DU and the transmit power of the MT includes:
respectively configuring at least one of the transmit power information of the DU and the transmit power information of the MT at different first moments,
where the first moments include at least one of the following:
a moment when the DU and n cell groups of the MT perform transmission simultaneously;
a moment when the DU and an MT's master cell group perform transmission simultaneously;
a moment when the DU and an MT's secondary cell group perform transmission simultaneously; or
a moment when n cell groups of the MT perform transmission simultaneously,
where 0≤n≤N, n is an integer, and N is the number of MT's cell groups.

It should be noted that in a case that the DU and the n cell groups of the MT perform transmission simultaneously, different values of n correspond to different first moments. For example, when n is 2, it corresponds to one first moment, and when n is 3, it corresponds to another first moment. similarly, in a case that the n cell groups of the MT perform transmission simultaneously, different values of n correspond to different first moments. In particular, in a case that the DU, the MT, or a cell group of the MT does not perform transmission, a transmit power of the DU, MT, or a cell group of the MT that does not perform transmission is 0. Optionally, configuring the transmit power information of the MT includes:
respectively configuring a transmit power of a physical random access channel and a transmit power of another uplink physical channel,
where the another uplink physical channel includes at least one of the following:
a transmit power of a physical uplink control channel;
a transmit power of a physical uplink shared channel; or
a transmit power of a sounding reference signal.

That is, in this embodiment of this application, obtaining of the transmit power of the PRACH is independent of obtaining of the transmit power of the another uplink physical channel, that is, the transmit power of the PRACH and the transmit power of the another uplink physical channel are respectively obtained through different signalings or manners.

In addition, different transmit power values may be defined on an MT-specific RACH occasion (MT-specific RACH occasion) and a common RACH occasion (common RACH occasion).

The power allocation method in this embodiment of this application will be described below with reference to specific allocation manners.

Allocation manner 1: first, a power between the DU and MT is allocated, second a power among multiple cell groups of the MT is allocated.

First, a static power is allocated between the DU and MT, or a semi-static power is allocated between the DU and MT; second, a transmit power is allocated for at least one cell group of the MT.

The static power allocated between the DU and MT may be a transmit power $P_0/P_{total}$ of the DU and a transmit power $P_{cmax}$ of the MT that are allocated as agreed in an agreement. The semi-static power configured between the DU and MT may be a maximum transmit power $Q_{DU}$ of the DU and a maximum transmit power $Q_{MT}$ of the MT that are configured through signaling, and different $Q_{DU}$ and $Q_{MT}$ may be configured according to the foregoing different transmission situations. Allocating the transmit power of at least one cell group of the MT may include allocating a maximum transmit power $Q_{MCG}$ of the MT's master cell group and a maximum transmit power $Q_{SCG}$ of the MT's secondary cell group.

Allocation manner 2: a power between the DU and at least one cell group of the MT is allocated separately.

The semi-static power is configured between the DU and multiple cell groups of the MT. For example, the maximum transmit power $Q_{DU}$ of the DU, a maximum transmit power $Q_1$ of the MT's master cell group, and a maximum transmit power $Q_2$ of the MT's secondary cell group are configured, $Q_{DU}+Q_1+Q_2 \leq P_{total}$, where $P_{total}$ is a supported total transmit power of the DU and MT.

Optionally, in a case that the DU and the multiple cell groups of the MT do not actually perform transmission simultaneously or are not configured to perform transmission simultaneously at a moment, the maximum transmit power of the DU is $P_{total}$ or $P_0$, and a maximum transmit power of each cell group of the MT is $P_{total}$ or $P_{cmax}$.

In addition, for configuration of the semi-static power between the DU and multiple cell groups of the MT, if $Q_1+Q_2>P_{cmax}$, traditional dynamic power sharing is used among cell groups of the MT. Alternatively, limitation $Q_1+Q_2 \leq P_{cmax}$ may be stipulated.

In the power allocation method according to this embodiment of this application, by allocation of the transmit power of the distributed unit DU and the transmit power of the at least one cell group of the MT, power sharing between the DU and the at least one cell group of the MT can be implemented, so that power efficiency for IAB transmission can be improved, and a manner for determining a transmit power of the IAB can be simplified.

It should be noted that the power obtaining method provided in this of this application may be performed by a power obtaining apparatus, or a control module that is in the power obtaining apparatus and that is configured to perform the power obtaining method. In an embodiment of this application, that the power obtaining apparatus performs the power obtaining method is used as an example to describe the power obtaining apparatus provided in this embodiment of this application.

Figure 5:
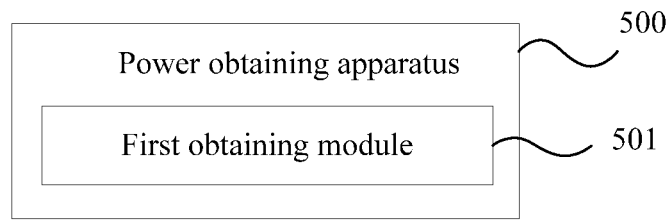
FIG. 5 is a schematic module diagram of a power obtaining apparatus according to an embodiment of this application.

As shown in FIG. 5, this embodiment of this application provides a power obtaining apparatus 500, applied to a first node device and including:
a first obtaining module 501, configured to obtain transmit power information of a distributed unit DU and transmit power information of a mobile Termination MT, where the transmit power information of the DU includes a transmit power or maximum transmit power of the DU, and the transmit power information of the MT includes a transmit power or maximum transmit power of at least one cell group of the MT.

For the power obtaining apparatus in this embodiment of this application, by obtaining the transmit power of the distributed unit DU and the transmit power of the at least one cell group of the MT, power sharing between the DU and the at least one cell group of the MT can be implemented, so that power efficiency for IAB transmission can be improved.

For the power obtaining apparatus in this embodiment of this application, the transmit power information of the MT further includes a transmit power of the MT. For the power obtaining apparatus in this embodiment of this application, the transmit power information of the DU and the transmit power information of the MT are valid at a first moment.

The first moment is a moment when the DU and the at least one cell group of the MT transmit information simultaneously.

For the power obtaining apparatus in this embodiment of this application, the first moment is a moment when the DU and the at least one cell group of the MT actually transmit information simultaneously, or the first moment is a moment when the DU and the at least one cell group of the MT are configured to transmit information simultaneously.

For the power obtaining apparatus in this embodiment of this application, the first moment is determined based on at least one of the following:
configuration of time division duplex TDD for the DU and MT; and
configuration of a resource type of the DU.

For the power obtaining apparatus in this embodiment of this application, the first obtaining module obtains at least one of the transmit power of the DU and the transmit power of the MT in at least one of the following manners:
a specification in a protocol;
configuration or indication by a centralized unit CU; or
configuration or indication by a parent node.

For the power obtaining apparatus in this embodiment of this application, the first obtaining module is configured to respectively obtain at least one of the transmit power information of the DU and the transmit power information of the MT at different first moments,
where the first moments include at least one of the following:
a moment when the DU and n cell groups of the MT perform transmission simultaneously;
a moment when the DU and an MT's master cell group perform transmission simultaneously;
a moment when the DU and an MT's secondary cell group perform transmission simultaneously; or
a moment when n cell groups of the MT perform transmission simultaneously,
where 0≤n≤N, n is an integer, and N is the number of MT's cell groups.

For the power obtaining apparatus in this embodiment of this application, the first obtaining module is configured to respectively obtain a transmit power of a physical random access channel and a transmit power of another uplink physical channel,
where a transmit power of the another uplink physical channel includes at least one of the following:
a transmit power of a physical uplink control channel;
a transmit power of a physical uplink shared channel; or
a transmit power of a sounding reference signal.

The power obtaining apparatus in this embodiment of this application further includes:
a notifying module, configured to notify, after the first obtaining module obtains the transmit power information of the distributed unit DU and the transmit power information of the MT, at least one of a sum of the transmit power of the DU and the transmit power of the MT, the transmit power information of the DU, or the transmit power information of the MT to a target node,
where the target node is a parent node of an integrated access backhaul IAB node, a child node of the IAB node, or a centralized unit CU connected to the DU, and the IAB node is an IAB node to which the DU and the MT belong.

For the power obtaining apparatus in this embodiment of this application, the maximum transmit power of the at least one cell group of the MT includes a maximum transmit power $Q_{MCG}$ of the MT's master cell group and a maximum transmit power $Q_{SCG}$ of the MT's secondary cell group.

The power obtaining apparatus further includes:
a second obtaining module, configured to obtain, after the first obtaining module obtains the transmit power information of the distributed unit DU and the transmit power information of the MT, an actually maximum transmit power of the MT's master cell group and an actually maximum transmit power of the MT's secondary cell group based on $Q_{MCG}$ and $Q_{SCG}$ and according to a preset power sharing rule.

The preset power sharing rule includes a first power sharing rule or a second power sharing rule,
where the first power sharing rule means that dynamic power sharing is implemented when a sum of $Q_{MCG}$ and $Q_{SCG}$ is greater than a first power; and
the second power sharing rule means that semi-static power sharing is implemented when the sum of $Q_{MCG}$ and $Q_{SCG}$ is less than or equal to the first power,
where the first power is the maximum transmit power of the MT or a preset fixed power value.

The power obtaining apparatus in this embodiment of this application further includes:
an adjusting module, configured to adjust, before the second obtaining module obtains the actually maximum transmit power of the MT's master cell group and the actually maximum transmit power of the MT's secondary cell group and in a case that the preset fixed power value is different from the maximum transmit power of the MT, at least one of $Q_{MCG}$ and $Q_{SCG}$ according to a difference between the preset fixed power value and the maximum transmit power of the MT.

The power obtaining apparatus in this embodiment of this application further includes:
a reporting module, configured to report at least one power headroom report PHR,
where an upper power limit calculated through the PHR is assumed as at least one of the following:
a power in the transmit power information; and
an actually maximum transmit power.

For the power obtaining apparatus in this embodiment of this application, by obtaining the transmit power of the distributed unit DU and the transmit power of the at least one cell group of the MT, power sharing between the DU and the at least one cell group of the MT can be implemented, so that power efficiency for IAB transmission can be improved.

The power obtaining apparatus in this embodiment of this application may be an apparatus, or may be a component, an integrated circuit, or a chip in a first node device.

The power obtaining apparatus provided in this embodiment of this application can implement the processes implemented in the method embodiments in FIG. 1 to FIG. 3, and a same technical effect can be achieved. To avoid repetition, details are not described herein again.

Figure 6:
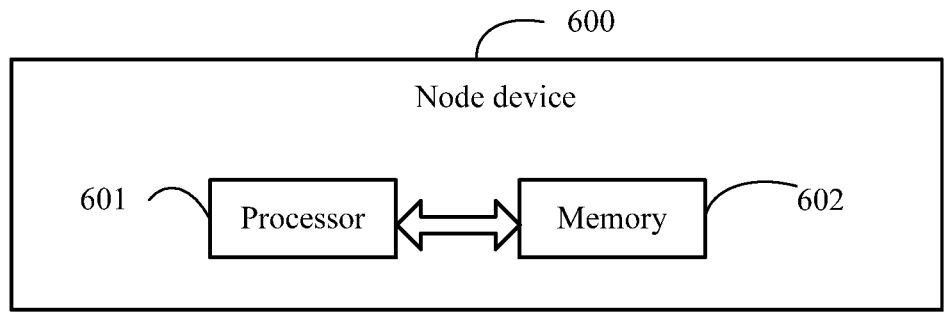
FIG. 6 is a first structural block diagram of a node device according to an embodiment of this application.

Optionally, as shown in FIG. 6, an embodiment of this application also provides a node device 600, where the node device is a first node device or a second node device, and the node device includes a processor 601, a memory 602, and a program or an instruction stored in the memory 602 and capable of running on the processor 601. For example, in a case that the node device 600 is the first node device, the program or instruction, when executed by the processor 601, implements the processes of the embodiments of the foregoing power obtaining method, and a same technical effect can be achieved. In a case that the node device 600 is the second node device, when the program or the instruction is executed by the processor 601, the processes of the embodiments of the foregoing power allocation method are implemented, and a same technical effect can be achieved. To avoid repetition, details are not described herein again.

It should be noted that the power allocation method provided in this of this application may be performed by a power allocation apparatus, or a control module that is in the power allocation apparatus and that is configured to perform the power allocation method. In an embodiment of this application, that the power allocation apparatus performs the power allocation method is used as an example to describe the power allocation apparatus provided in this embodiment of this application.

Figure 7:
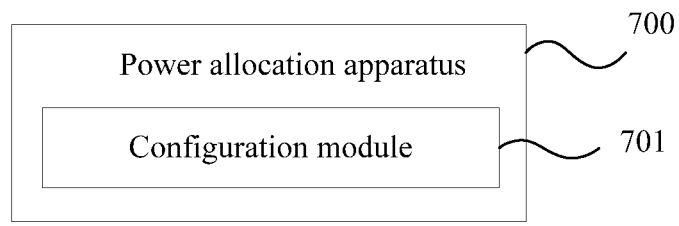
FIG. 7 is a schematic block diagram of a power allocation apparatus according to an embodiment of this application.

As shown in FIG. 7, an embodiment of this application also provides a power allocation apparatus 700, applied to a second node device and including:
  a configuring module 701, configured to configure transmit power information of a distributed unit DU and transmit power information of an MT,
  where the transmit power information of the DU includes a transmit power or maximum transmit power of the DU, and the transmit power information of the MT includes a transmit power or maximum transmit power of at least one cell group of the MT.

For the power allocation apparatus in this embodiment of this application, by configuration of the transmit power of the distributed unit DU and the transmit power of the at least one cell group of the MT, power sharing between the DU and the at least one cell group of the MT can be implemented, so that power efficiency for IAB transmission can be improved, and a manner for determining a transmit power of IAB can be simplified.

For the power allocation apparatus in this embodiment of this application, the transmit power information of the MT further includes a transmit power of the MT.

For the power allocation apparatus in this embodiment of this application, the configuring module is configured to respectively configure at least one of the transmit power information of the DU and the transmit power information of the MT at different first moments,
  where the first moments include at least one of the following:
  a moment when the DU and n cell groups of the MT perform transmission simultaneously;
  a moment when the DU and an MT's master cell group perform transmission simultaneously;
  a moment when the DU and an MT's secondary cell group perform transmission simultaneously; or
  a moment when n cell groups of the MT perform transmission simultaneously, where $0 \leq n \leq N$, n is an integer, and N is the number of MT's cell groups.

For the power allocation apparatus in this embodiment of this application, the allocation module is configured to respectively configure a transmit power of a physical random access channel and a transmit power of another uplink physical channel,
  where the another uplink physical channel includes at least one of the following:
  a transmit power of a physical uplink control channel;
  a transmit power of a physical uplink shared channel; or
  a transmit power of a sounding reference signal.

For the power allocation apparatus in this embodiment of this application, by configuration of the transmit power of the distributed unit DU and the transmit power of the at least one cell group of the MT, power sharing between the DU and the at least one cell group of the MT can be implemented, so that power efficiency for IAB transmission can be improved, and a manner for determining a transmit power of IAB can be simplified.

Figure 8:
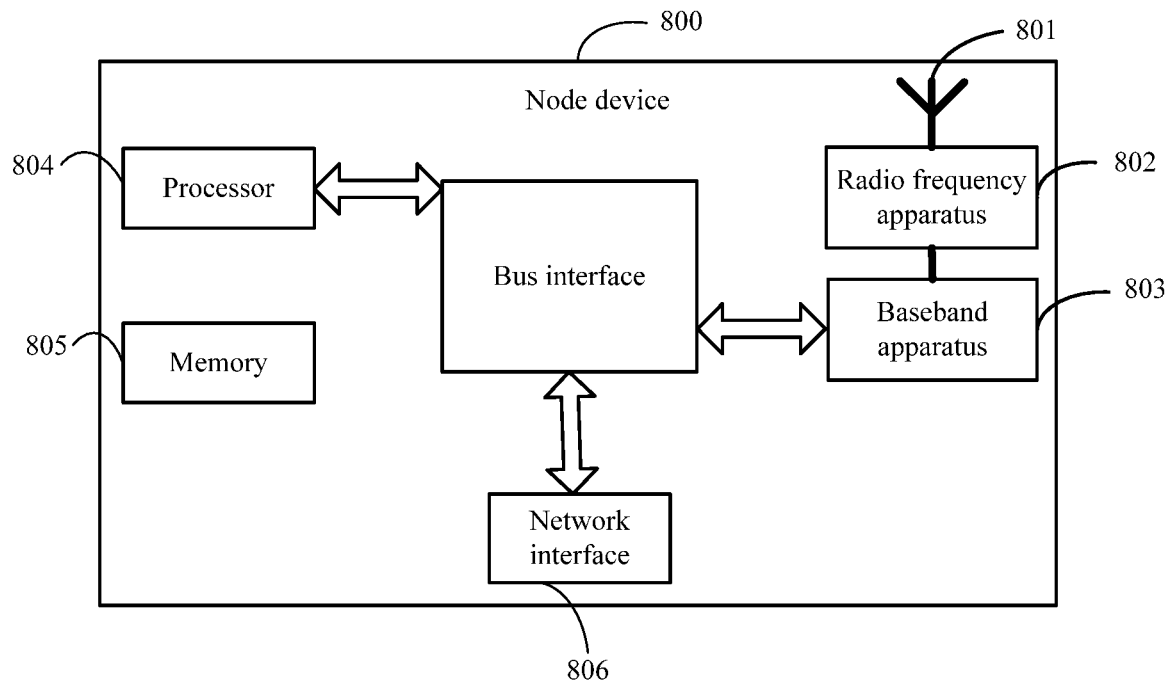
FIG. 8 is a second structural block diagram of a node device according to an embodiment of this application.

As shown in FIG. 8, an embodiment of this application also provides a node device, where the node device is the foregoing first node device or second node device, and the node device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and transmits the received information to the baseband apparatus 803 for processing. In a downlink direction, the baseband apparatus 803 processes to-be-transmitted information, and transmits the to-be-transmitted information to the radio frequency apparatus 802. After processing the received information, the radio frequency apparatus 802 transmits the information by using the antenna 801.

A frequency band processing apparatus may be located in the baseband apparatus 803. The method performed by the first node device or second node device in the foregoing embodiment may be implemented in the baseband apparatus 803. The baseband apparatus 803 includes a processor 804 and a memory 805.

The baseband apparatus 803 may include, for example, at least one baseband board, where multiple chips are disposed on the baseband board. As shown in FIG. 8, one chip is, for example, the processor 804, which is connected to the memory 805, so as to invoke a program in the memory 805 to perform operations shown in the foregoing method embodiment.

The baseband apparatus 803 may further include a network interface 806, configured to exchange information with the radio frequency apparatus 802. For example, the interface is a common public radio interface (CPRI).

Alternatively, the node device in this embodiment of the present disclosure further includes an instruction or a program stored in the memory 805 and capable of running on the processor 804. The processor 804 invokes the instruction or the program in the memory 805 to perform the method performed by the modules shown in FIG. 6 or FIG. 7, and a same technical effect is achieved. To avoid repetition, details are not described herein again.

An embodiment of this application further provides a readable storage medium, where the readable storage medium stores a program or an instruction, and when the program or the instruction is executed by a processor, the processes of the foregoing embodiments of the power obtaining method or the foregoing embodiments of the power allocation method are implemented, and a same technical effect can be achieved. To avoid repetition, details are not described herein again.

The processor is a processor in the node device in the foregoing embodiment. The readable storage medium includes a computer-readable storage medium such as a read-only memory (ROM), a random access memory (RAM), a magnetic disk, an optical disc, or the like.

An embodiment of this application also provides a chip, where the chip includes a processor and a communication interface, the communication interface is coupled to the processor, and the processor is configured to run the program or instruction of the node device, so that the processes of the foregoing embodiments of the power obtaining method or the foregoing embodiments of the power allocation method can be implemented, and a same technical effect can be achieved. To avoid repetition, details are not repeated herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements, but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementation manners, a person skilled in the art may clearly understand that the methods in the foregoing embodiments may be implemented by software in addition to a necessary universal hardware platform or by hardware only. In most circumstances, the former is a preferred implementation manner. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. A power obtaining method performed by a first node device, comprising:
  obtaining transmit power information of a distributed unit (DU) and transmit power information of a mobile Termination (MT),
  wherein the transmit power information of the DU comprises a maximum transmit power of the DU, and the transmit power information of the MT comprises a maximum transmit power of at least one cell group of the MT;
  wherein the maximum transmit power of the at least one cell group of the MT comprises a maximum transmit power $Q_{MCG}$ of an MT's master cell group and a maximum transmit power $Q_{SCG}$ of an MT's secondary cell group; and
  after obtaining the transmit power information of the distributed unit (DU) and the transmit power information of the MT, the method further comprises:
  obtaining an actually maximum transmit power of the MT's master cell group and an actually maximum transmit power of the MT's secondary cell group based on $Q_{MCG}$ and $Q_{SCG}$ and according to a preset power sharing rule,
  wherein the preset power sharing rule comprises a first power sharing rule or a second power sharing rule,
  wherein the first power sharing rule means that dynamic power sharing is implemented when a sum of $Q_{MCG}$ and $Q_{SCG}$ is greater than a first power; and
  the second power sharing rule means that semi-static power sharing is implemented when the sum of $Q_{MCG}$ and $Q_{SCG}$ is less than or equal to the first power,
  wherein the first power is the maximum transmit power of the MT or a preset fixed power value.

2. The power obtaining method according to claim 1, wherein the transmit power information of the DU and the transmit power information of the MT are valid at a first moment,
  wherein the first moment is a moment when the DU and the at least one cell group of the MT transmit information simultaneously.

3. The power obtaining method according to claim 2, wherein the first moment is a moment when the DU and the at least one cell group of the MT actually transmit information simultaneously,
  or the first moment is a moment when the DU and the at least one cell group of the MT are configured to transmit information simultaneously.

4. The power obtaining method according to claim 3, wherein the first moment is determined based on at least one of the following:
  configuration of time division duplex (TDD) for the DU and MT; and
  configuration of a resource type of the DU.

5. The power obtaining method according to claim 2, wherein the obtaining transmit power information of a distributed unit (DU) and transmit power information of a mobile Termination (MT) comprises:
  respectively obtaining at least one of the transmit power information of the DU and the transmit power information of the MT at different first moments,
  wherein the first moments comprise at least one of the following:

a moment when the DU and n cell groups of the MT perform transmission simultaneously;
a moment when the DU and an MT's master cell group perform transmission simultaneously;
a moment when the DU and an MT's secondary cell group perform transmission simultaneously; or
a moment when n cell groups of the MT perform transmission simultaneously,
wherein 0≤n≤N, n is an integer, and N is the number of MT's cell groups.

6. The power obtaining method according to claim 1, wherein at least one of the transmit power information of the DU and the transmit power information of the MT is obtained in at least one of the following manners:
a specification in a protocol;
configuration or indication by a centralized unit (CU); or
configuration or indication by a parent node.

7. The power obtaining method according to claim 1, wherein obtaining the transmit power information of the MT comprises:
respectively obtaining a transmit power of a physical random access channel and a transmit power of another uplink physical channel,
wherein the another uplink physical channel comprises at least one of the following:
a transmit power of a physical uplink control channel;
a transmit power of a physical uplink shared channel; or
a transmit power of a sounding reference signal.

8. The power obtaining method according to claim 1, wherein after obtaining the transmit power information of the distributed unit (DU) and the transmit power information of the MT, the method further comprises:
notifying at least one of a sum of the transmit power of the DU and a transmit power of the MT, the transmit power information of the DU, or the transmit power information of the MT to a target node,
wherein the target node is a parent node of an integrated access backhaul IAB node, a child node of the IAB node, or a centralized unit (CU) connected to the DU, and the IAB node is an IAB node to which the DU and the MT belong.

9. The power obtaining method according to claim 1, wherein before the obtaining an actually maximum transmit power of the MT's master cell group and an actually maximum transmit power of the MT's secondary cell group, the method further comprises:
adjusting at least one of $Q_{MCG}$ and $Q_{SCG}$ according to a difference between the preset fixed power value and the maximum transmit power of the MT in a case that the preset fixed power value is different from the maximum transmit power of the MT.

10. The power obtaining method according to claim 1, further comprising:
reporting at least one power headroom report (PHR),
wherein an upper power limit calculated through the PHR is at least one of the following:
a power in the transmit power information; and an actually maximum transmit power.

11. A power allocation method performed by a second node device, comprising:
configuring transmit power information of a distributed unit (DU) and transmit power information of an MT,
wherein the transmit power information of the DU comprises a maximum transmit power of the DU, and the transmit power information of the MT comprises a maximum transmit power of at least one cell group of the MT;
wherein the maximum transmit power of the at least one cell group of the MT comprises a maximum transmit power $Q_{MCG}$ of an MT's master cell group and a maximum transmit power $Q_{SCG}$ of an MT's secondary cell group; and
after obtaining the transmit power information of the distributed unit (DU) and the transmit power information of the MT, the method further comprises:
obtaining an actually maximum transmit power of the MT's master cell group and an actually maximum transmit power of the MT's secondary cell group based on $Q_{MCG}$ and $Q_{SCG}$ and according to a preset power sharing rule,
wherein the preset power sharing rule comprises a first power sharing rule or a second power sharing rule,
wherein the first power sharing rule means that dynamic power sharing is implemented when a sum of $Q_{MCG}$ and $Q_{SCG}$ is greater than a first power; and
the second power sharing rule means that semi-static power sharing is implemented when the sum of $Q_{MCG}$ and $Q_{SCG}$ is less than or equal to the first power,
wherein the first power is the maximum transmit power of the MT or a preset fixed power value.

12. The power allocation method according to claim 11, wherein the configuring transmit power information of a distributed unit (DU) and transmit power information of an MT comprises:
respectively configuring at least one of the transmit power information of the DU and the transmit power information of the MT at different first moments,
wherein the first moments comprise at least one of the following:
a moment when the DU and n cell groups of the MT perform transmission simultaneously;
a moment when the DU and an MT's master cell group perform transmission simultaneously;
a moment when the DU and an MT's secondary cell group perform transmission simultaneously; or
a moment when n cell groups of the MT perform transmission simultaneously,
wherein 0≤n≤N, n is an integer, and N is the number of MT's cell groups.

13. The power allocation method according to claim 11, wherein configuring the transmit power information of the MT comprises:
respectively configuring a transmit power of a physical random access channel and a transmit power of another uplink physical channel,
wherein the another uplink physical channel comprises at least one of the following:
a transmit power of a physical uplink control channel;
a transmit power of a physical uplink shared channel; or
a transmit power of a sounding reference signal.

14. A node device, comprising:
a processor; and
a memory storing a program or an instruction that is capable of running on the processor, wherein the program or instruction, when executed by the processor, causes the node device to perform the power allocation method according to claim 11.

15. A node device, comprising:
a processor; and
a memory storing a program or an instruction that is capable of running on the processor, wherein the program or instruction, when executed by the processor, causes the node device to perform the following steps:

obtaining transmit power information of a distributed unit (DU) and transmit power information of a mobile Termination (MT), wherein the transmit power information of the DU comprises a maximum transmit power of the DU, and the transmit power information of the MT comprises a maximum transmit power of at least one cell group of the MT;

wherein the maximum transmit power of the at least one cell group of the MT comprises a maximum transmit power $Q_{MCG}$ of an MT's master cell group and a maximum transmit power $Q_{SCG}$ of an MT's secondary cell group; and after obtaining the transmit power information of the distributed unit (DU) and the transmit power information of the MT, the method further comprises:

obtaining an actually maximum transmit power of the MT's master cell group and an actually maximum transmit power of the MT's secondary cell group based on $Q_{MCG}$ and $Q_{SCG}$ and according to a preset power sharing rule, wherein the preset power sharing rule comprises a first power sharing rule or a second power sharing rule, wherein the first power sharing rule means that dynamic power sharing is implemented when a sum of $Q_{MCG}$ and $Q_{SCG}$ is greater than a first power; and the second power sharing rule means that semi-static power sharing is implemented when the sum of $Q_{MCG}$ and $Q_{SCG}$ is less than or equal to the first power, wherein the first power is the maximum transmit power of the MT or a preset fixed power value.

16. The node device according to claim 15, wherein the transmit power information of the DU and the transmit power information of the MT are valid at a first moment, wherein the first moment is a moment when the DU and the at least one cell group of the MT transmit information simultaneously.

17. The node device according to claim 16, wherein the first moment is a moment when the DU and the at least one cell group of the MT actually transmit information simultaneously, or the first moment is a moment when the DU and the at least one cell group of the MT are configured to transmit information simultaneously.

18. The node device according to claim 15, wherein after obtaining the transmit power information of the distributed unit (DU) and the transmit power information of the MT, the program or instruction, when executed by the processor, causes the node device to further perform the following steps:

notifying at least one of a sum of the transmit power of the DU and a transmit power of the MT, the transmit power information of the DU, or the transmit power information of the MT to a target node, wherein the target node is a parent node of an integrated access backhaul IAB node, a child node of the IAB node, or a centralized unit (CU) connected to the DU, and the IAB node is an IAB node to which the DU and the MT belong.

19. The node device according to claim 15, wherein the program or instruction, when executed by the processor, causes the node device to further perform the following steps:

reporting at least one power headroom report (PHR), wherein an upper power limit calculated through the PHR is at least one of the following:

a power in the transmit power information; and an actually maximum transmit power.

* * * * *